(12) United States Patent
Joseph et al.

(10) Patent No.: US 11,510,222 B2
(45) Date of Patent: Nov. 22, 2022

(54) SIGNALING FOR PROTOCOL DATA UNIT PREEMPTION

(71) Applicant: QUALCOMM Incorporated, San Diego, CA (US)

(72) Inventors: Vinay Joseph, Calicut (IN); Sitaramanjaneyulu Kanamarlapudi, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 16/864,013

(22) Filed: Apr. 30, 2020

(65) Prior Publication Data

US 2020/0351910 A1 Nov. 5, 2020

Related U.S. Application Data

(60) Provisional application No. 62/842,388, filed on May 2, 2019.

(51) Int. Cl.
*H04W 4/00* (2018.01)
*H04W 72/12* (2009.01)
*H04L 47/24* (2022.01)

(52) U.S. Cl.
CPC ....... *H04W 72/1242* (2013.01); *H04L 47/245* (2013.01); *H04W 72/1284* (2013.01); *H04W 72/1289* (2013.01)

(58) Field of Classification Search
CPC ............... H04W 72/042; H04W 72/10; H04W 72/0453; H04W 72/14

USPC ................. 370/328, 329, 330, 331
See application file for complete search history.

(56) References Cited

U.S. PATENT DOCUMENTS

| | | | |
|---|---|---|---|
| 11,051,322 B2* | 6/2021 | Yu | H04W 4/70 |
| 2010/0322156 A1* | 12/2010 | Wu | H04L 5/003 |
| | | | 370/329 |
| 2017/0223701 A1* | 8/2017 | Bendle | H04W 72/1289 |
| 2018/0270700 A1 | 9/2018 | Babaei et al. | |
| 2018/0376504 A1* | 12/2018 | Si | H04L 1/16 |
| 2020/0146045 A1* | 5/2020 | Loehr | H04W 72/1242 |
| 2020/0236582 A1* | 7/2020 | Chin | H04W 72/14 |
| 2020/0236688 A1* | 7/2020 | Lin | H04W 72/10 |

(Continued)

FOREIGN PATENT DOCUMENTS

| | | | | |
|---|---|---|---|---|
| CN | 108289065 A | * | 7/2018 | ............ H04W 24/02 |
| WO | WO-2017026517 A1 | * | 2/2017 | ............ H04W 72/02 |

(Continued)

OTHER PUBLICATIONS

International Search Report and Written Opinion—PCT/US2020/030980—ISA/EPO—dated Jul. 20, 2020.

*Primary Examiner* — David Q Nguyen
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may determine that handling of a protocol data unit (PDU) by the UE is preempted. The UE may transmit an indication that the preempted PDU is preempted. The indication may be generated by a physical layer of the UE, or by a MAC layer of the UE. The UE may receive information for a transmission of the preempted PDU. Numerous other aspects are provided.

31 Claims, 9 Drawing Sheets

(56) References Cited

U.S. PATENT DOCUMENTS

| | | | |
|---|---|---|---|
| 2020/0259601 A1* | 8/2020 | Zhou | H04L 5/0085 |
| 2020/0274654 A1* | 8/2020 | Loehr | H04W 72/1268 |
| 2021/0045122 A1* | 2/2021 | Shi | H04L 5/0044 |
| 2021/0266953 A1* | 8/2021 | Pelletier | H04W 72/14 |
| 2022/0132556 A1* | 4/2022 | Alabbasi | H04L 1/1812 |
| 2022/0174683 A1* | 6/2022 | Alabbasi | H04W 72/10 |

FOREIGN PATENT DOCUMENTS

| | | | | |
|---|---|---|---|---|
| WO | WO-2018130034 A1 * | 7/2018 | | H04L 47/78 |
| WO | WO-2020193609 A1 * | 10/2020 | | H04W 72/042 |

* cited by examiner

SIGNALING FOR PROTOCOL DATA UNIT PREEMPTION

CROSS-REFERENCE TO RELATED APPLICATION

This Patent Application claims priority to U.S. Provisional Patent Application No. 62/842,388, filed on May 2, 2019, entitled "SIGNALING FOR PROTOCOL DATA UNIT PREEMPTION," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for signaling for protocol data unit (PDU) preemption.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining that handling of a protocol data unit (PDU) by the UE is preempted; transmitting an indication that the preempted PDU is preempted; and receiving scheduling information for a transmission of the preempted PDU.

In some aspects, a method of wireless communication, performed by a base station, may include receiving an indication that a preempted PDU is preempted based at least in part on handling of the preempted PDU by a UE being preempted; and transmitting scheduling information for a transmission of the preempted PDU.

In some aspects, a UE for wireless communication may include memory and one or more processors operatively coupled to the memory. The memory and the one or more processors may be configured to determine that handling of a PDU by the UE is preempted; transmit an indication that the preempted PDU is preempted; and receive scheduling information for a transmission of the preempted PDU.

In some aspects, a base station for wireless communication may include memory and one or more processors operatively coupled to the memory. The memory and the one or more processors may be configured to receive an indication that a preempted PDU is preempted based at least in part on handling of the preempted PDU by a UE being preempted; and transmit scheduling information for a transmission of the preempted PDU.

In some aspects, a non-transitory computer-readable medium may store one or more instructions for wireless communication. The one or more instructions, when executed by one or more processors of a UE, may cause the one or more processors to: determine that handling of a PDU by the UE is preempted; transmit an indication that the preempted PDU is preempted; and receive scheduling information for a transmission of the preempted PDU.

In some aspects, a non-transitory computer-readable medium may store one or more instructions for wireless communication. The one or more instructions, when executed by one or more processors of a base station, may cause the one or more processors to: receive an indication that a PDU is preempted based at least in part on handling of the preempted PDU by a UE being preempted; and transmit scheduling information for a transmission of the preempted PDU.

In some aspects, an apparatus for wireless communication may include means for determining that handling of a PDU by the apparatus is preempted; means for transmitting an indication that the preempted PDU is preempted; and means for receiving scheduling information for a transmission of the preempted PDU.

In some aspects, an apparatus for wireless communication may include means for receiving an indication that a preempted PDU is preempted based at least in part on handling of the preempted PDU by a UE being preempted; and means for transmitting scheduling information for a transmission of the preempted PDU.

In some aspects, a method of wireless communication, performed by a UE, may include determining that handling of a PDU by the UE is preempted; transmitting an indication, generated by a medium access control (MAC) layer of the UE, that the preempted PDU is preempted; and receiving scheduling information for a transmission of the preempted PDU.

In some aspects, a method of wireless communication, performed by a UE, may include determining that handling of a PDU by the UE is preempted; transmitting an indication, generated by a physical layer of the UE, that the preempted PDU is preempted; and receiving scheduling information for a transmission of the preempted PDU.

In some aspects, a UE for wireless communication may include memory and one or more processors operatively coupled to the memory. The memory and the one or more processors may be configured to determine that handling of a PDU by the UE is preempted; transmit an indication, generated by a MAC layer of the UE, that the preempted PDU is preempted; and receive scheduling information for a transmission of the preempted PDU.

In some aspects, a UE for wireless communication may include memory and one or more processors operatively coupled to the memory. The memory and the one or more processors may be configured to determine that handling of a PDU by the UE is preempted; transmit an indication, generated by a physical layer of the UE, that the preempted PDU is preempted; and receive scheduling information for a transmission of the preempted PDU.

In some aspects, a non-transitory computer-readable medium may store one or more instructions for wireless communication. The one or more instructions, when executed by one or more processors of a UE, may cause the one or more processors to: determine that handling of a PDU by the UE is preempted; transmit an indication, generated by a physical layer of the UE, that the preempted PDU is preempted; and receive scheduling information for a transmission of the preempted PDU.

In some aspects, a non-transitory computer-readable medium may store one or more instructions for wireless communication. The one or more instructions, when executed by one or more processors of a UE, may cause the one or more processors to: determine that handling of a PDU by the UE is preempted; transmit an indication, generated by a MAC layer of the UE, that the preempted PDU is preempted; and receive scheduling information for a transmission of the preempted PDU.

In some aspects, an apparatus for wireless communication may include means for determining that handling of a PDU by the apparatus is preempted; means for transmitting an indication, generated by a physical layer of the apparatus, that the preempted PDU is preempted; and means for receiving scheduling information for a transmission of the preempted PDU.

In some aspects, an apparatus for wireless communication may include means for determining that handling of a PDU by the apparatus is preempted; means for transmitting an indication, generated by a MAC layer of the UE, that the preempted PDU is preempted; and means for receiving scheduling information for a transmission of the preempted PDU.

In some aspects, a method of wireless communication, performed by a base station, may include receiving an indication, generated by a MAC layer of a UE, that handling of a PDU by the UE is preempted; and transmitting scheduling information for a transmission of the preempted PDU.

In some aspects, a base station for wireless communication may include memory and one or more processors operatively coupled to the memory. The memory and the one or more processors may be configured to receive an indication, generated by a MAC layer of a UE, that handling of a PDU by the UE is preempted; and transmit scheduling information for a transmission of the preempted PDU.

In some aspects, a non-transitory computer-readable medium may store one or more instructions for wireless communication. The one or more instructions, when executed by one or more processors of a base station, may cause the one or more processors to: receive an indication, generated by a MAC layer of a UE, that handling of a PDU by the UE is preempted; and transmit scheduling information for a transmission of the preempted PDU.

In some aspects, an apparatus for wireless communication may include means for receiving an indication, generated by a MAC layer of a UE, that handling of a PDU by the UE is preempted; and means for transmitting scheduling information for a transmission of the preempted PDU.

In some aspects, a method of wireless communication, performed by a base station, may include receiving an indication, generated by a physical layer of a UE, that handling of a PDU by the UE is preempted; and transmitting scheduling information for a transmission of the preempted PDU.

In some aspects, a base station for wireless communication may include memory and one or more processors operatively coupled to the memory. The memory and the one or more processors may be configured to receive an indication, generated by a physical layer of a UE, that handling of a PDU by the UE is preempted; and transmit scheduling information for a transmission of the preempted PDU.

In some aspects, a non-transitory computer-readable medium may store one or more instructions for wireless communication. The one or more instructions, when executed by one or more processors of a base station, may cause the one or more processors to: receive an indication, generated by a physical layer of a UE, that handling of a PDU by the UE is preempted; and transmit scheduling information for a transmission of the preempted PDU.

In some aspects, an apparatus for wireless communication may include means for receiving an indication, generated by a physical layer of a UE, that handling of a PDU by the UE is preempted; and means for transmitting scheduling information for a transmission of the preempted PDU.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
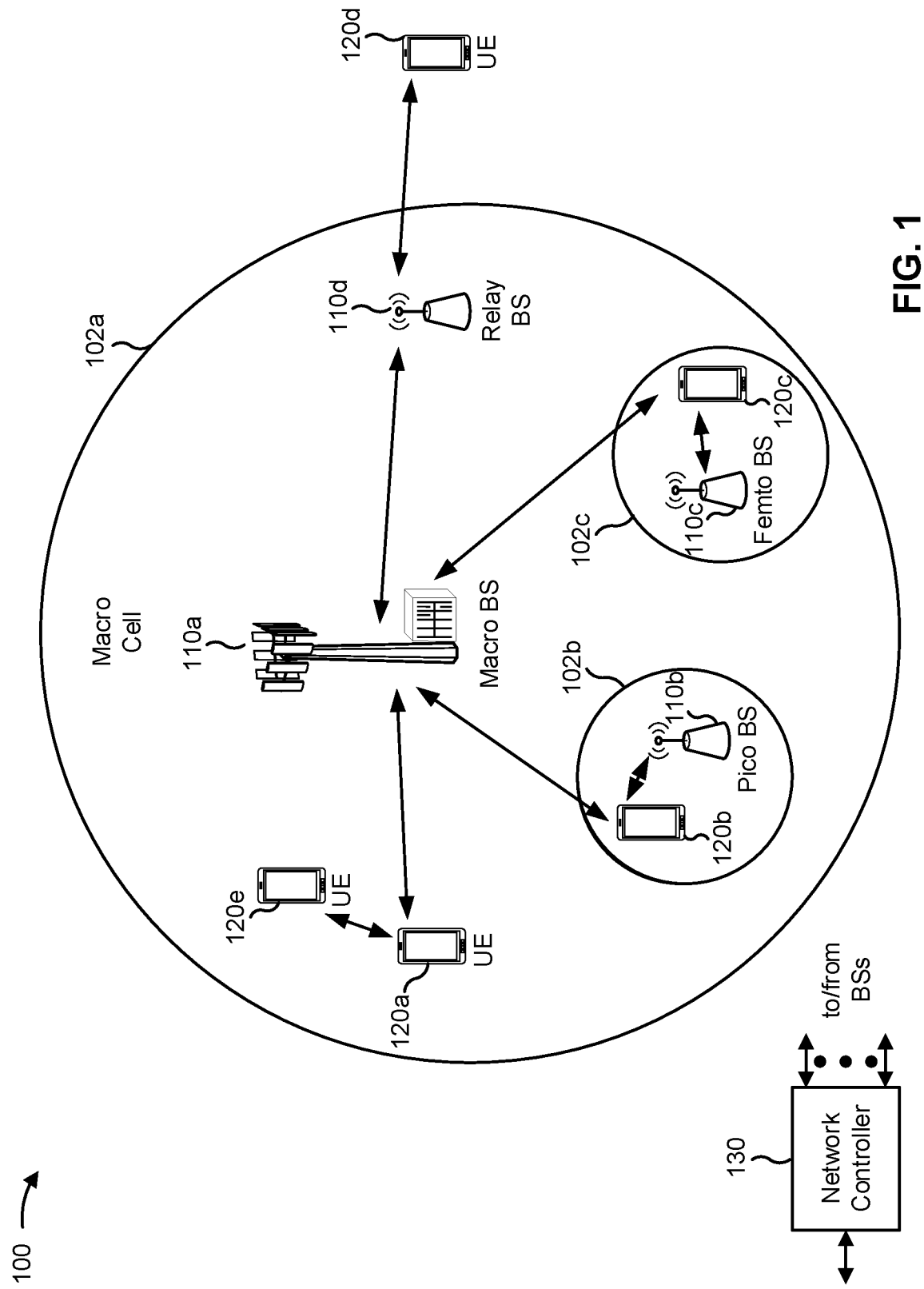
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
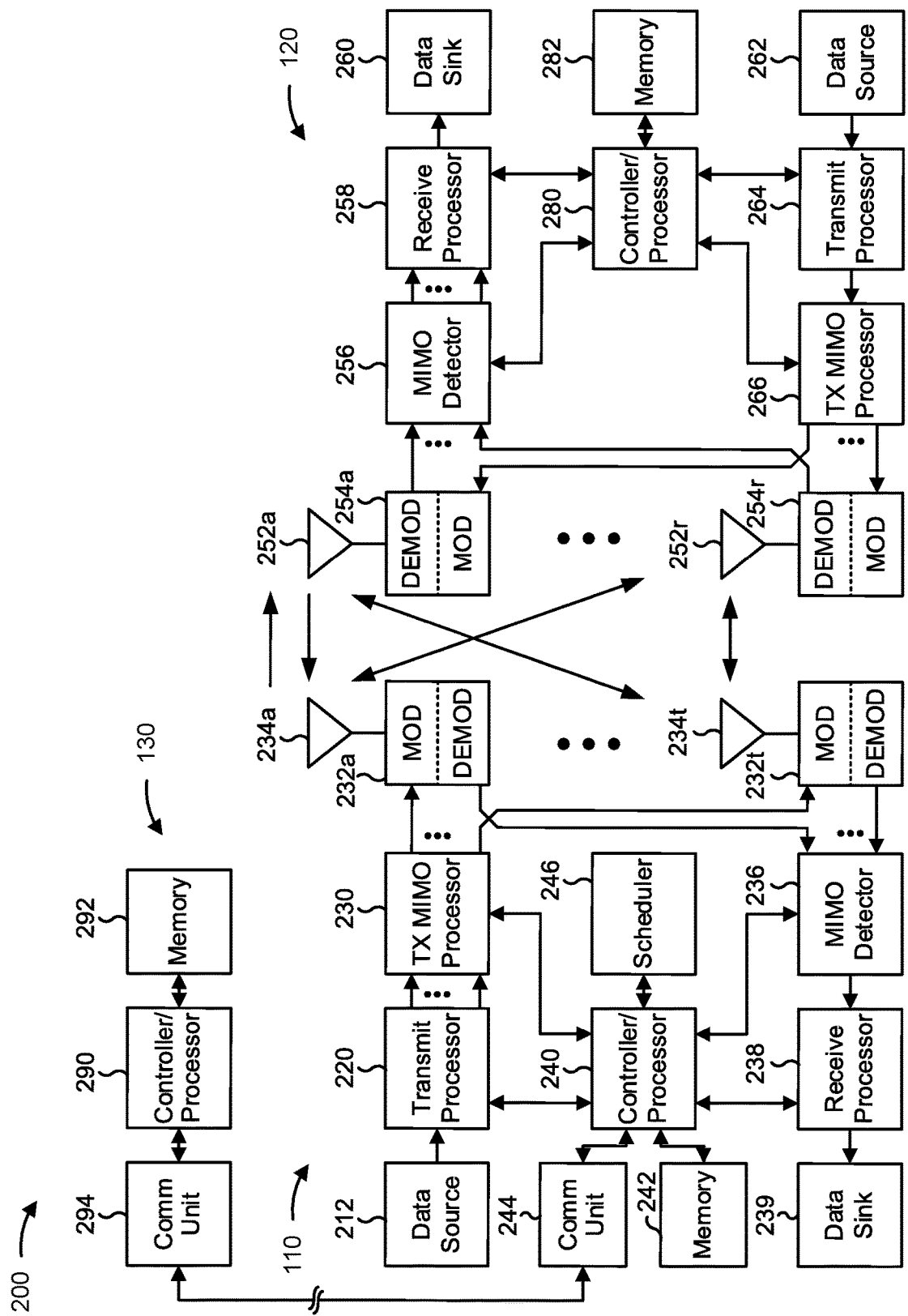
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with signaling for PDU preemption, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, process 600 of FIG. 6, process 700 of FIG. 7, process 800 of FIG. 8, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining that handling of a PDU by the UE is preempted; means for transmitting an indication that the preempted PDU is preempted; means for receiving scheduling information for a transmission of the preempted PDU; and/or the like. In some aspects, such means may include one or more components of UE 120 described in connection with FIG. 2.

In some aspects, base station 110 may include means for receiving an indication that a preempted PDU is preempted based at least in part on handling of the preempted PDU being preempted; means for transmitting scheduling information for a transmission of the preempted PDU; means for identifying the preempted PDU based at least in part on the indication; and/or the like. In some aspects, such means may include one or more components of base station 110 described in connection with FIG. 2.

As indicated above, FIG. 2 is provided as an example. Other examples may differ from what is described with regard to FIG. 2.

A UE may prepare a protocol data unit (PDU) for uplink transmission. For example, the UE may generate the PDU in a media access control (MAC) layer, may provide the PDU to a physical (PHY) layer, may process the PDU in the PHY layer for transmission, and may transmit the PDU. With increasing usage of intra-UE prioritization, an increasing number of PDUs may be preempted during handling by the PHY layer. For example, PDU handling may be interrupted due to a higher-priority grant being received, a scheduling request being transmitted by the UE, and/or the like. In this case, the BS may have difficulty identifying whether a PDU was preempted, particular for bursty traffic sources. This may lead to dropped traffic and reduced air interface efficiency.

Some techniques and apparatuses described herein provide signaling of PDU preemption by a UE. For example, the UE may determine that handling of a PDU is preempted, and may signal an indication that handling of the preempted PDU is preempted. The BS may identify the preempted PDU based at least in part on the indication, and may provide scheduling information for a transmission (e.g., a first transmission, a hybrid automatic repeat request (HARD) retransmission, and/or the like) of the preempted PDU. Thus, preempted PDUs may be identified to the BS using the indication, and the BS may schedule transmission of the preempted PDUs, thereby improving reliability of uplink communication and facilitating intra-UE prioritization.

Figure 3:
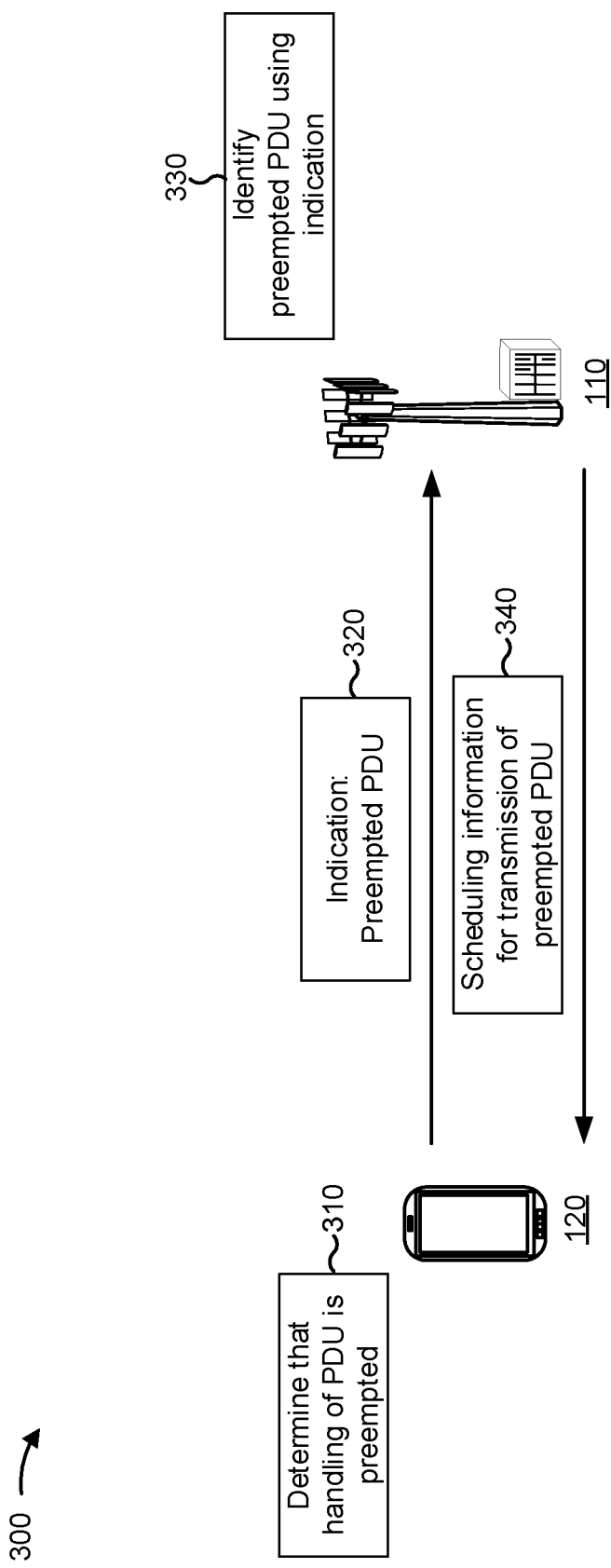
FIG. 3 is a diagram illustrating an example of signaling for PDU data preemption, in accordance with various aspects of the present disclosure.

FIG. 3 is a diagram illustrating an example 300 of signaling for PDU data preemption, in accordance with various aspects of the present disclosure. As shown, example 300 includes a UE 120 and a BS 110.

As shown in FIG. 3, and by reference number 310, the UE 120 may determine that handling of a PDU is preempted. In some aspects, the preemption can occur during generation of the PDU (e.g., generation of a MAC transport block (TB) in the MAC layer), during processing or preparation for transmission of the PDU in the PHY layer, or during transmission of the PDU in the PHY layer. In some aspects, the UE 120 may determine that handling of the PDU is preempted based at least in part on receiving a higher-priority grant for an uplink transmission that overlaps the PDU, transmitting a scheduling request on a resource that overlaps the PDU, determining that a higher-priority processing task than handling of the PDU is to be performed, and/or the like.

In some aspects, the UE 120 may determine that handling of the PDU is preempted based at least in part on an indication from a layer of the UE. For example, when the indication regarding the preempted PDU is a MAC CE, a PHY layer of the UE 120 may provide an indication to a MAC layer of the UE 120 that a PDU is preempted so that the MAC layer can generate the MAC CE. As another example, when the indication regarding the preempted PDU is a PHY-layer signal, a MAC layer of the UE 120 may provide an indication to a PHY layer of the UE 120 that a PDU is preempted so that the PHY layer can generate the PHY-layer signal.

As shown by reference number 320, the UE 120 may transmit, to the BS 110, an indication that handling of the preempted PDU is preempted. In some aspects, the indication may explicitly or implicitly identify the preempted PDU, as described in more detail below. In some aspects, the indication may be transmitted in a PDU. For example, the indication may be transmitted in a PDU that preempted the preempted PDU, or in a PDU that is transmitted after the preempted PDU would otherwise have been transmitted.

In some aspects, the indication may be transmitted using a MAC control element (CE). For example, a MAC layer of the UE 120 may generate a MAC CE that includes the indication. In some aspects, the MAC CE may use a format specific to indicating that the preempted PDU is preempted. For example, the MAC CE may use a format that is not specified in Release 15 of the 3GPP NR Technical Specifications.

In some aspects, the indication may include information explicitly identifying the preempted PDU. For example, the indication may include information identifying a HARQ process identifier associated with the preempted PDU. As another example, the indication may include information identifying a grant associated with the preempted PDU or a resource allocation associated with the preempted PDU. Thus, the BS 110 may identify the preempted PDU based at least in part on the information explicitly identifying the preempted PDU, which may conserve processor resources that would otherwise be used by the BS 110 to identify the preempted PDU based at least in part on an implicit indication or an indication that does not identify the preempted PDU.

In some aspects, the indication may be based at least in part on a buffer report MAC CE. For example, the indication may be based at least in part on a buffer status report (BSR) MAC CE or another type of buffer report CE. In some aspects, the buffer report MAC CE may include an identifier of only a logical channel group associated with the preempted PDU. This may be referred to herein as a short buffer report MAC CE. This may indicate, to the BS 110, that a PDU associated with the logical channel group identified by the identifier has been preempted. Thus, the short buffer report MAC CE may implicitly identify the preempted PDU. In some aspects, the buffer report MAC CE may include identifiers of all logical channel groups associated with the UE 120, and may indicate a non-zero buffer size only for the logical channel group associated with the preempted PDU. This may indicate a size of the preempted PDU, which may be helpful for identifying the preempted PDU.

In some aspects, the buffer report MAC CE may indicate a buffer size corresponding to only the preempted PDU. For example, this may indicate that the UE 120 has buffered the preempted PDU for later transmission. In some aspects, the buffer report MAC CE may indicate a buffer size corresponding to a sum of a size of the preempted PDU and an amount of data available for the logical channel group associated with the preempted PDU.

In some aspects, the indication may be provided as a PHY-layer signal. For example, the UE 120 may use an indication generated by the PHY layer to indicate preemption. In this case, when an operation at the MAC layer (e.g., preemption of a PDU by another PDU for a configured grant) causes preemption of a PDU, the MAC layer may provide an indication to the PHY layer, which may be used by the PHY layer to generate the indication.

In some aspects, the PHY-layer signal may be provided as part of a shared channel, such as a physical uplink shared channel (PUSCH). For example, the UE 120 may add information to a payload of the PUSCH, may encode the PUSCH in a particular fashion, may transmit the PUSCH using particular resources, and/or the like, which may indicate to the BS 110 that the preempted PDU is preempted. In some aspects, the PUSCH may be associated with a PDU that caused the preemption, or may be associated with a PDU that is transmitted after the PDU that caused the preemption. In some aspects, the PHY-layer signal may be provided as part of a control channel, such as a physical uplink control channel (PUCCH). In this case, the PHY-layer signal may comprise uplink control information and/or the like. In some aspects, the PHY-layer signal may be provided using a reference signal, such as a demodulation reference signal, a sounding reference signal, or a different type of reference signal. For example, the UE 120 may encode or scramble the reference signal to indicate the preempted PDU, may transmit the reference signal on a particular resource to indicate the preempted PDU, and/or the like. Thus, the UE 120 may use a PHY-layer signal to indicate the preempted PDU, which may reduce latency and resource usage relative to generating the indicator in the MAC layer.

As shown by reference number 330, the BS 110 may identify the preempted PDU using (e.g., based at least in part on) the indication. As shown by reference number 340, the BS 110 may transmit scheduling information for transmission of the preempted PDU. For example, the BS 110 may identify the preempted PDU based at least in part on an explicit indication (e.g., a HARQ process identifier associated with the preempted PDU, a resource allocation associated with the preempted PDU, and/or the like), an implicit indication (e.g., a logical channel group identifier associated with the preempted PDU, and/or the like), or scheduling information known to the BS 110 (e.g., based at least in part on grants provided by the BS 110, an expected PDU that was not received, and/or the like). The BS 110 may transmit scheduling information (e.g., a grant, and/or the like) for the UE 120 to transmit the preempted PDU. For example, the BS 100 may transmit scheduling information that identifies a resource allocation for a transmission of the preempted PDU, a HARQ retransmission of the preempted PDU, and/or the like. Thus, the BS 110 may provide for retransmission of a preempted PDU based at least in part on an indication of the preempted PDU from the UE 120, thereby improving efficiency of the network and reducing disruption associated with preemption of PDUs.

As indicated above, FIG. 3 is provided as an example. Other examples may differ from what is described with respect to FIG. 3.

Figure 4:
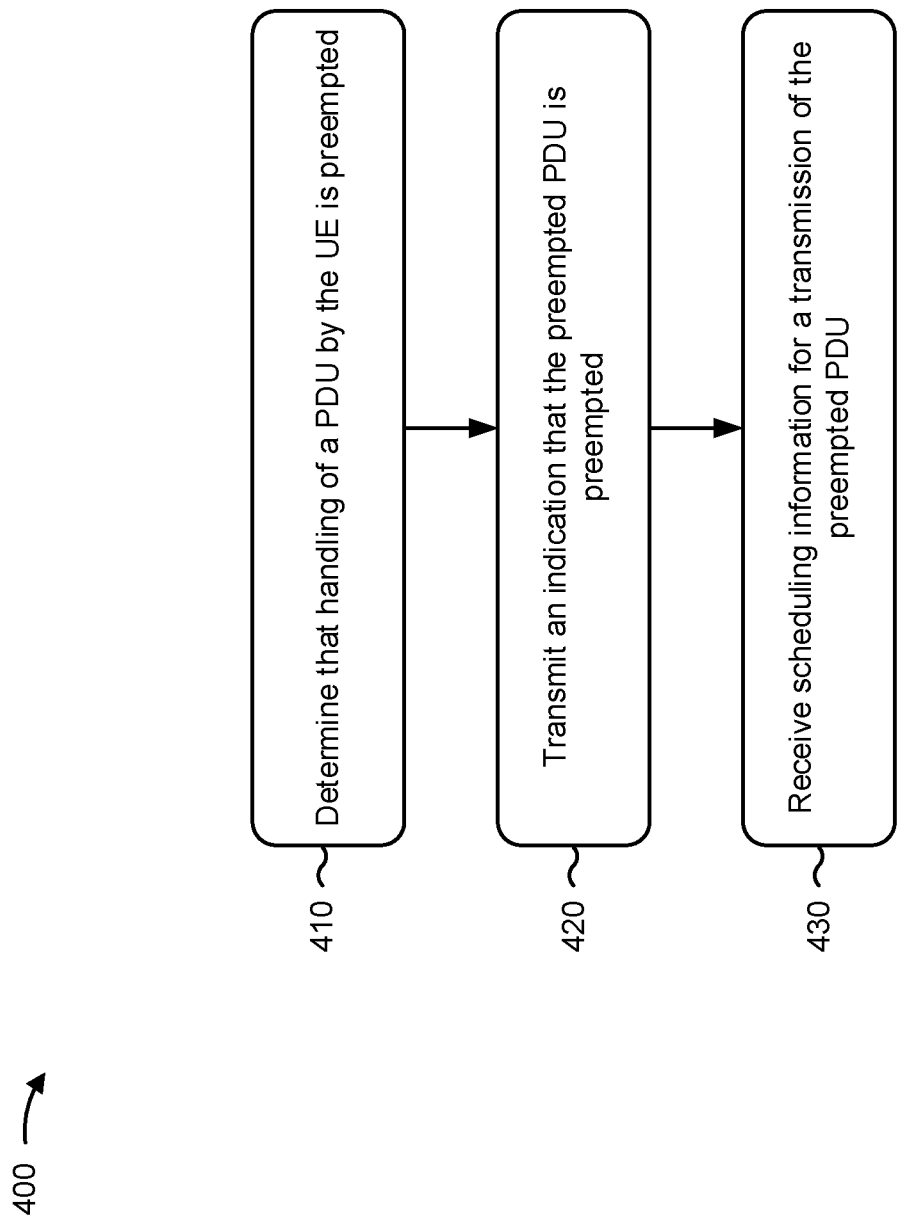
FIG. 4 is a diagram illustrating an example process performed, for example, by a user equipment, in accordance with various aspects of the present disclosure.

FIG. 4 is a diagram illustrating an example process 400 performed, for example, by a user equipment, in accordance with various aspects of the present disclosure. Example process 400 is an example where a UE (e.g., user equipment 120 and/or the like) performs operations associated with signaling for protocol data unit preemption.

As shown in FIG. 4, in some aspects, process 400 may include determining that handling of a PDU by the UE is preempted (block 410). For example, the user equipment (e.g., using controller/processor 280, transmit processor 264, TX MIMO processor 266, MOD 254, antenna 252, and/or the like) may determine that handling of a protocol data unit (PDU) by the UE is preempted, as described above.

As further shown in FIG. 4, in some aspects, process 400 may include transmitting an indication that the preempted PDU is preempted (block 420). For example, the user equipment (e.g., using controller/processor 280, transmit processor 264, TX MIMO processor 266, MOD 254, antenna 252, and/or the like) may transmit an indication that the preempted PDU is preempted, as described above.

As further shown in FIG. 4, in some aspects, process 400 may include receiving scheduling information for a transmission of the preempted PDU (block 430). For example, the user equipment (e.g., using receive processor 258, transmit processor 264, controller/processor 280, memory 282, and/or the like) may receive scheduling information for a transmission of the preempted PDU, as described above.

Process 400 may include additional aspects, such as any single aspect or any combination of aspects described below and/or in connection with one or more other processes described elsewhere herein.

In a first aspect, the indication comprises a media access control (MAC) control element (CE).

In a second aspect, alone or in combination with the first aspect, the indication is transmitted in a PDU that is transmitted after the preempted PDU.

In a third aspect, alone or in combination with the first aspect, the indication is transmitted in a PDU that preempts the preempted PDU.

In a fourth aspect, alone or in combination with one or more of the first through third aspects, the indication is transmitted in connection with information received from a physical layer of the UE that indicates that the preempted PDU is preempted in the physical layer of the UE.

In a fifth aspect, alone or in combination with one or more of the first through fourth aspects, the indication includes a hybrid automatic repeat request (HARD) process identifier associated with the preempted PDU.

In a sixth aspect, alone or in combination with one or more of the first through fifth aspects, the indication includes a buffer report MAC CE that identifies a logical channel group identifier associated with the preempted PDU.

In a seventh aspect, alone or in combination with one or more of the first through sixth aspects, the buffer report MAC CE is a short buffer MAC CE with a zero buffer size.

In an eighth aspect, alone or in combination with one or more of the first through sixth aspects, the buffer report MAC CE is a long buffer report MAC CE with a non-zero buffer size.

In a ninth aspect, alone or in combination with one or more of the first through eighth aspects, a buffer size of the buffer report MAC CE indicates a size of the preempted PDU.

In a tenth aspect, alone or in combination with one or more of the first through ninth aspects, a buffer size of the buffer report MAC CE indicates a sum of a size of the preempted PDU and data available for a logical channel group associated with the preempted PDU.

In an eleventh aspect, alone or in combination with one or more of the first through tenth aspects, the indication is generated by a physical layer of the UE.

In a twelfth aspect, alone or in combination with one or more of the first through eleventh aspects, the indication is generated by a physical layer of the UE based at least in part on signaling received from a MAC layer of the UE.

In a thirteenth aspect, alone or in combination with one or more of the first through twelfth aspects, the indication is transmitted as part of an uplink shared channel.

In a fourteenth aspect, alone or in combination with one or more of the first through thirteenth aspects, the indication is transmitted as part of an uplink control channel.

In a fifteenth aspect, alone or in combination with one or more of the first through fourteenth aspects, the indication comprises a reference signal.

In a sixteenth aspect, alone or in combination with one or more of the first through fifteenth aspects, the preempted PDU is one of a plurality of preempted PDUs, wherein the indication identifies the plurality of preempted PDUs.

In a seventeenth aspect, alone or in combination with one or more of the first through sixteenth aspects, the preempted PDU is one of a plurality of preempted PDUs, wherein transmitting the indication further comprises transmitting a plurality of indications corresponding to the plurality of preempted PDUs.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
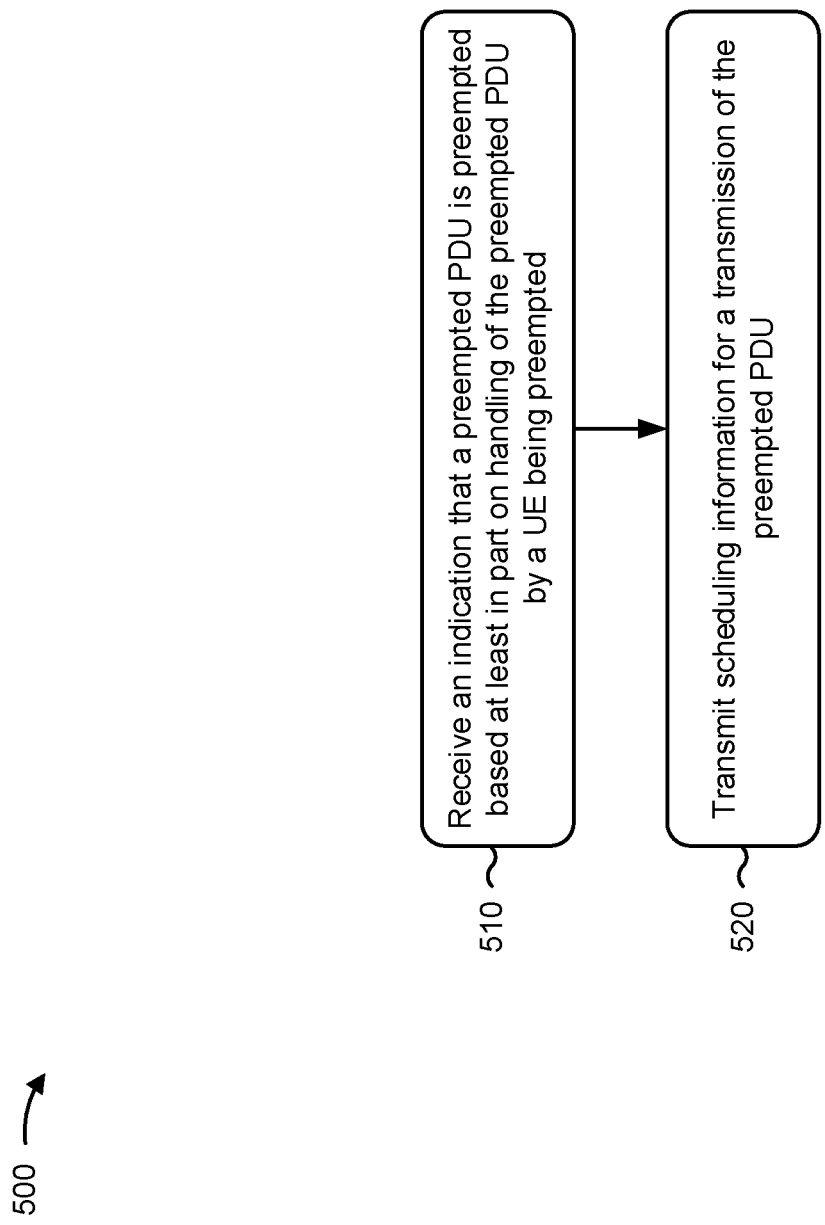
FIG. 5 is a diagram illustrating an example process performed, for example, by a base station, in accordance with various aspects of the present disclosure.

FIG. 5 is a diagram illustrating an example process 500 performed, for example, by a base station, in accordance with various aspects of the present disclosure. Example process 500 is an example where a base station (e.g., base station 110 and/or the like) performs operations associated with signaling for protocol data unit preemption.

As shown in FIG. 5, in some aspects, process 500 may include receiving an indication that a preempted PDU is preempted based at least in part on handling of the preempted PDU being preempted (block 510). For example, the base station (e.g., using antenna 234, DEMOD 232, MIMO detector 236, receive processor 238, controller/processor 240, and/or the like) may receive an indication that a preempted PDU is preempted based at least in part on handling of the preempted PDU by a UE being preempted, as described above.

As further shown in FIG. 5, in some aspects, process 500 may include transmitting scheduling information for a transmission of the preempted PDU (block 520). For example, the base station (e.g., using controller/processor 240, transmit processor 220, TX MIMO processor 230, MOD 232, antenna 234, and/or the like) may transmit scheduling information for a transmission of the preempted PDU, as described above.

Process 500 may include additional aspects, such as any single aspect or any combination of aspects described below and/or in connection with one or more other processes described elsewhere herein.

In a first aspect, the base station may identify the preempted PDU based at least in part on the indication.

In a second aspect, alone or in combination with the first aspect, the indication comprises a MAC CE.

In a third aspect, alone or in combination with one or more of the first and second aspects, the indication is received in a PDU that is transmitted after the preempted PDU would otherwise have been transmitted.

In a fourth aspect, alone or in combination with one or more of the first through second aspects, the indication is received in a PDU that preempts the preempted PDU.

In a fifth aspect, alone or in combination with one or more of the first through fourth aspects, the indication includes a hybrid automatic repeat request (HARD) process identifier associated with the preempted PDU.

In a sixth aspect, alone or in combination with one or more of the first through fifth aspects, the indication includes a buffer report MAC CE that identifies a logical channel group identifier associated with the preempted PDU.

In a seventh aspect, alone or in combination with one or more of the first through sixth aspects, the buffer report MAC CE is a short buffer MAC CE with a zero buffer size.

In an eighth aspect, alone or in combination with one or more of the first through sixth aspects, the buffer report MAC CE is a long buffer report MAC CE with a non-zero buffer size.

In a ninth aspect, alone or in combination with one or more of the first through eighth aspects, a buffer size of the buffer report MAC CE indicates a size of the preempted PDU.

In a tenth aspect, alone or in combination with one or more of the first through ninth aspects, a buffer size of the buffer report MAC CE indicates a sum of a size of the preempted PDU and data available for a logical channel group associated with the preempted PDU.

In an eleventh aspect, alone or in combination with one or more of the first through tenth aspects, the indication is received as part of an uplink shared channel.

In a twelfth aspect, alone or in combination with one or more of the first through eleventh aspects, the indication is received as part of an uplink control channel.

In a thirteenth aspect, alone or in combination with one or more of the first through twelfth aspects, the indication comprises a reference signal.

In a fourteenth aspect, alone or in combination with one or more of the first through thirteenth aspects, the preempted PDU is one of a plurality of preempted PDUs, wherein the indication identifies the plurality of preempted PDUs.

In a fifteenth aspect, alone or in combination with one or more of the first through fourteenth aspects, the preempted PDU is one of a plurality of preempted PDUs, wherein transmitting the indication further comprises transmitting a plurality of indications corresponding to the plurality of preempted PDUs.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
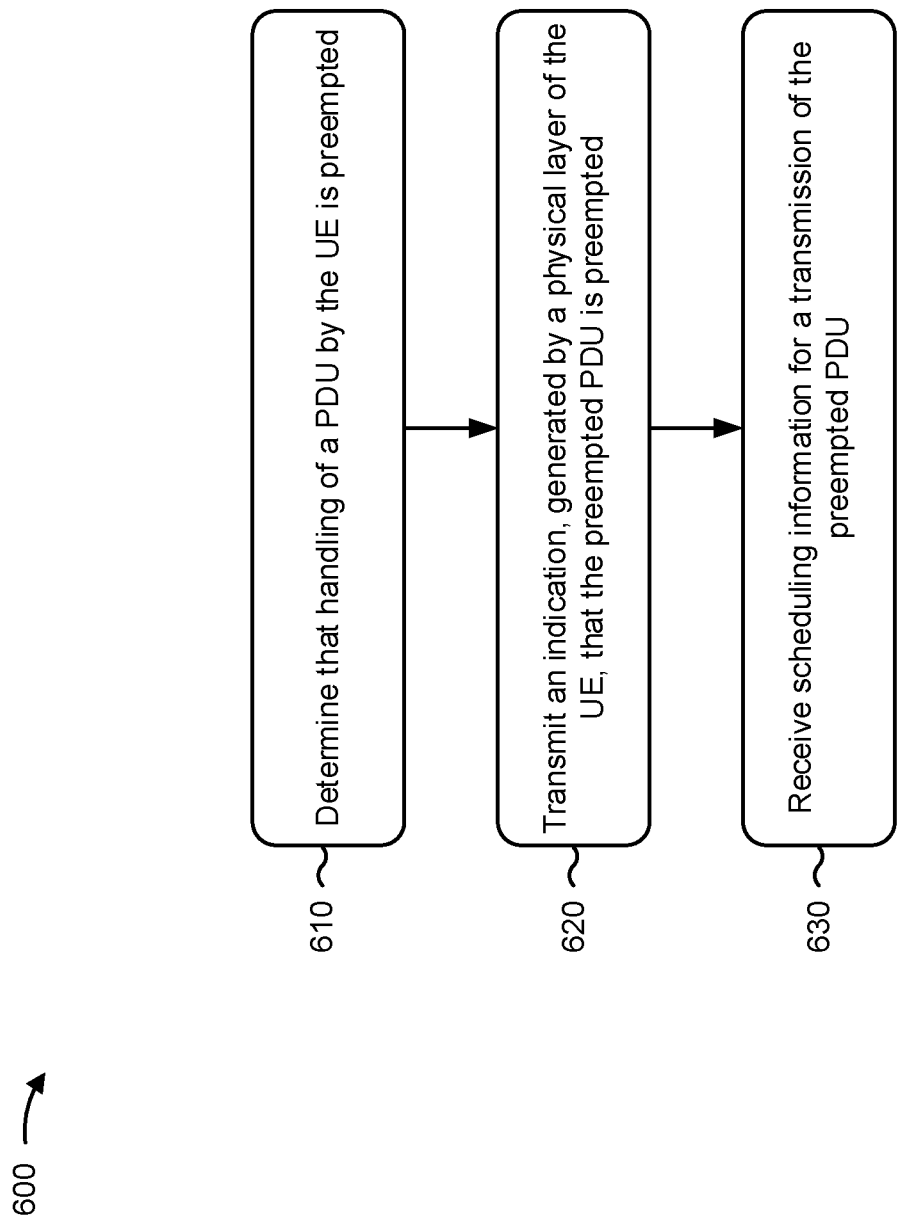
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120 and/or the like) performs operations associated with signaling for protocol data unit preemption.

As shown in FIG. 6, in some aspects, process 600 may include determining that handling of a PDU by the UE is preempted (block 610). For example, the UE (e.g., using controller/processor 280, transmit processor 264, TX MIMO processor 266, MOD 254, antenna 252, and/or the like) may determine that handling of a PDU by the UE is preempted, as described above.

As further shown in FIG. 6, in some aspects, process 600 may include transmitting an indication, generated by a physical layer of the UE, that the preempted PDU is preempted (block 620). For example, the UE (e.g., using controller/processor 280, transmit processor 264, TX MIMO processor 266, MOD 254, antenna 252, and/or the like) may transmit an indication, generated by a physical layer of the UE, that the preempted PDU is preempted, as described above.

As further shown in FIG. 6, in some aspects, process 600 may include receiving scheduling information for a transmission of the preempted PDU (block 630). For example, the UE (e.g., using antenna 252, DEMOD 254, MIMO detector 256, receive processor 258, controller/processor 280, and/or the like) may receive scheduling information for a transmission of the preempted PDU, as described above.

Process 600 may include additional aspects, such as any single aspect or any combination of aspects described below and/or in connection with one or more other processes described elsewhere herein.

In a first aspect, the indication is generated based at least in part on signaling received by the physical layer of the UE from a MAC layer of the UE.

In a second aspect, alone or in combination with the first aspect, the indication is transmitted as part of an uplink shared channel.

In a third aspect, alone or in combination with one or more of the first and second aspects, the indication is transmitted as part of an uplink control channel.

In a fourth aspect, alone or in combination with one or more of the first through third aspects, the indication comprises a reference signal.

In a fifth aspect, alone or in combination with one or more of the first through fourth aspects, the preempted PDU is one of a plurality of preempted PDUs, and the indication identifies the plurality of preempted PDUs.

In a sixth aspect, alone or in combination with one or more of the first through fifth aspects, the preempted PDU is one of a plurality of preempted PDUs, and transmitting the indication further comprises transmitting a plurality of indications corresponding to the plurality of preempted PDUs.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
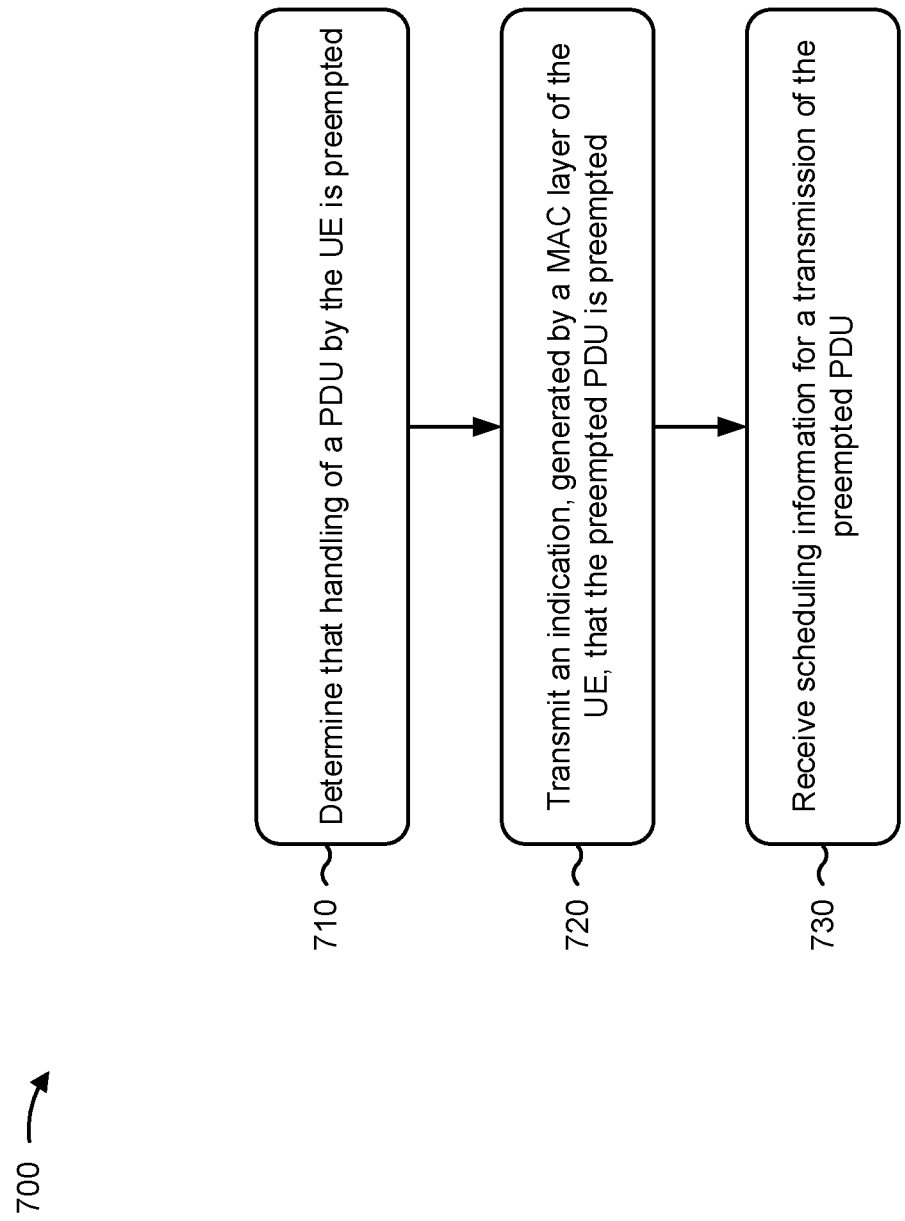
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120 and/or the like) performs operations associated with signaling for protocol data unit preemption.

As shown in FIG. 7, in some aspects, process 700 may include determining that handling of a PDU by the UE is preempted (block 710). For example, the UE (e.g., using controller/processor 280, transmit processor 264, TX MIMO processor 266, MOD 254, antenna 252, and/or the like) may determine that handling of a PDU by the UE is preempted, as described above.

As further shown in FIG. 7, in some aspects, process 700 may include transmitting an indication, generated by a MAC layer of the UE, that the preempted PDU is preempted (block 720). For example, the UE (e.g., using controller/processor 280, transmit processor 264, TX MIMO processor 266, MOD 254, antenna 252, and/or the like) may transmit an indication, generated by a MAC layer of the UE, that the preempted PDU is preempted, as described above.

As further shown in FIG. 7, in some aspects, process 700 may include receiving scheduling information for a transmission of the preempted PDU (block 730). For example, the UE (e.g., using antenna 252, DEMOD 254, MIMO detector 256, receive processor 258, controller/processor 280, and/or the like) may receive scheduling information for a transmission of the preempted PDU, as described above.

Process 700 may include additional aspects, such as any single aspect or any combination of aspects described below and/or in connection with one or more other processes described elsewhere herein.

In a first aspect, the indication comprises a MAC CE.

In a second aspect, alone or in combination with the first aspect, the indication is transmitted in a PDU that is transmitted after the preempted PDU.

In a third aspect, alone or in combination with one or more of the first and second aspects, the indication is transmitted in a PDU that preempts the preempted PDU.

In a fourth aspect, alone or in combination with one or more of the first through third aspects, the indication is transmitted in connection with information received by the MAC layer from a physical layer of the UE that indicates that the preempted PDU is preempted in the physical layer of the UE.

In a fifth aspect, alone or in combination with one or more of the first through fourth aspects, the indication includes a HARQ process identifier associated with the preempted PDU.

In a sixth aspect, alone or in combination with one or more of the first through fifth aspects, the indication includes a buffer report MAC CE that identifies a logical channel group identifier associated with the preempted PDU.

In a seventh aspect, alone or in combination with one or more of the first through sixth aspects, the buffer report MAC CE is a short buffer MAC CE with a zero buffer size.

In an eighth aspect, alone or in combination with one or more of the first through seventh aspects, the buffer report MAC CE is a long buffer report MAC CE with a non-zero buffer size.

In a ninth aspect, alone or in combination with one or more of the first through eighth aspects, a buffer size of the buffer report MAC CE indicates a size of the preempted PDU.

In a tenth aspect, alone or in combination with one or more of the first through ninth aspects, a buffer size of the buffer report MAC CE indicates a sum of a size of the preempted PDU and data available for a logical channel group associated with the preempted PDU.

In an eleventh aspect, alone or in combination with one or more of the first through tenth aspects, the preempted PDU is one of a plurality of preempted PDUs, and the indication identifies the plurality of preempted PDUs.

In a twelfth aspect, alone or in combination with one or more of the first through eleventh aspects, the preempted PDU is one of a plurality of preempted PDUs, and transmitting the indication further comprises transmitting a plurality of indications corresponding to the plurality of preempted PDUs.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
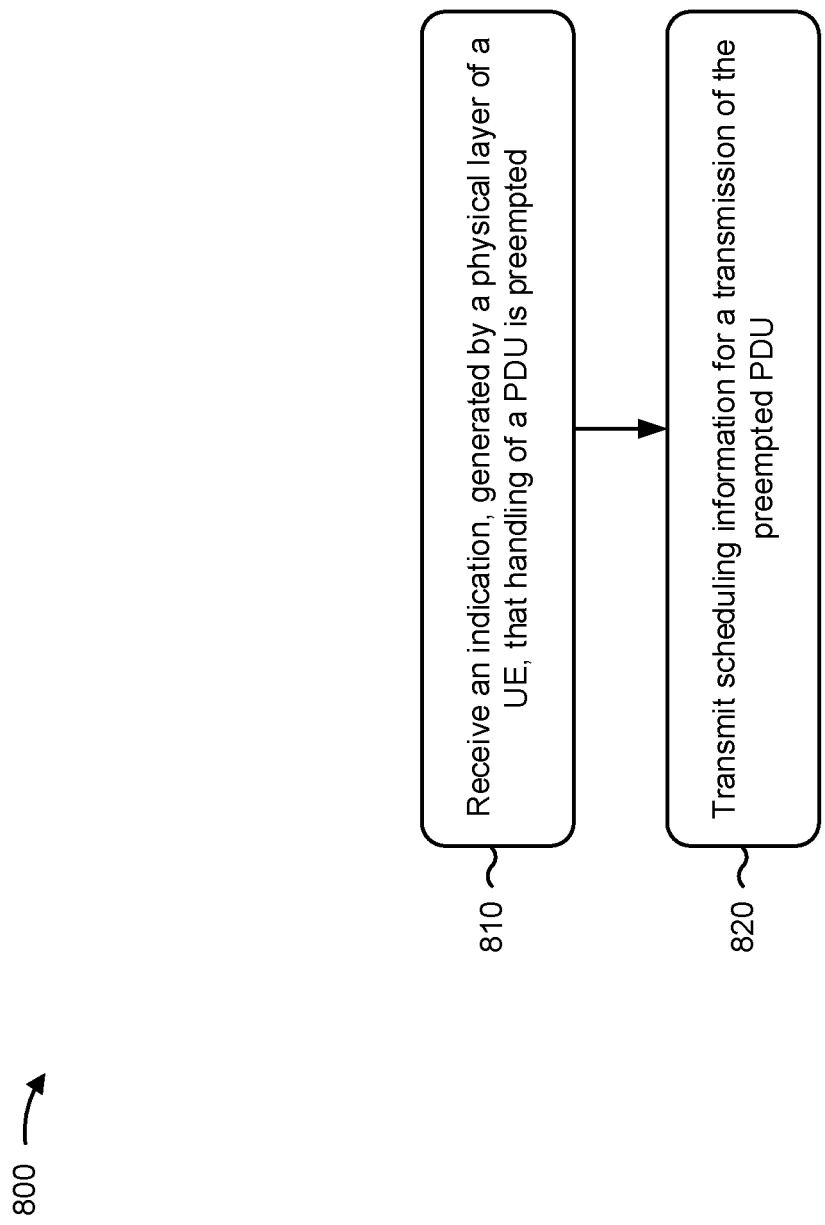
FIG. 8 is a diagram illustrating an example process performed, for example, by a base station, in accordance with various aspects of the present disclosure.

FIG. 8 is a diagram illustrating an example process 800 performed, for example, by a base station, in accordance with various aspects of the present disclosure. Example process 800 is an example where the base station (e.g., base station 110 and/or the like) performs operations associated with signaling for protocol data unit preemption.

As shown in FIG. 8, in some aspects, process 800 may include receiving an indication, generated by a physical layer of a UE, that handling of a PDU is preempted (block 810). For example, the base station (e.g., using transmit processor 220, receive processor 238, controller/processor 240, memory 242, and/or the like) may receive an indication, generated by a physical layer of a UE, that handling of a PDU is preempted, as described above.

As further shown in FIG. 8, in some aspects, process 800 may include transmitting scheduling information for a transmission of the preempted PDU (block 820). For example, the base station (e.g., using transmit processor 220, receive processor 238, controller/processor 240, memory 242, and/or the like) may transmit scheduling information for a transmission of the preempted PDU, as described above.

Process 800 may include additional aspects, such as any single aspect or any combination of aspects described below and/or in connection with one or more other processes described elsewhere herein.

In a first aspect, the indication is received as part of an uplink shared channel.

In a second aspect, alone or in combination with the first aspect, the indication is received as part of an uplink control channel.

In a third aspect, alone or in combination with one or more of the first and second aspects, the indication comprises a reference signal.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
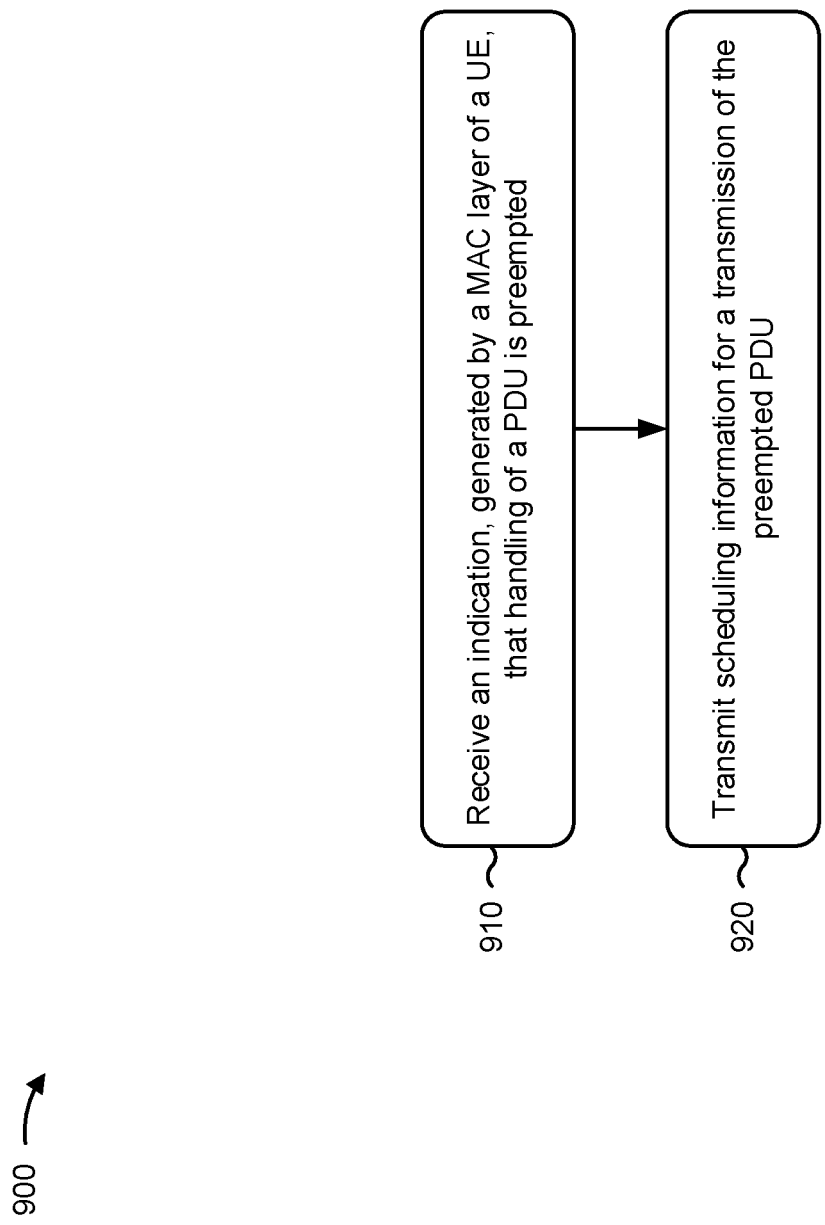
FIG. 9 is a diagram illustrating an example process performed, for example, by a base station, in accordance with various aspects of the present disclosure.

FIG. 9 is a diagram illustrating an example process 900 performed, for example, by a base station, in accordance with various aspects of the present disclosure. Example process 900 is an example where the base station (e.g., base station 110 and/or the like) performs operations associated with signaling for protocol data unit preemption.

As shown in FIG. 9, in some aspects, process 900 may include receiving an indication, generated by a MAC layer of a UE, that handling of a PDU is preempted (block 910). For example, the base station (e.g., using transmit processor 220, receive processor 238, controller/processor 240, memory 242, and/or the like) may receive an indication, generated by a MAC layer of a UE, that handling of a PDU is preempted, as described above.

As further shown in FIG. 9, in some aspects, process 900 may include transmitting scheduling information for a transmission of the preempted PDU (block 920). For example, the base station (e.g., using transmit processor 220, receive processor 238, controller/processor 240, memory 242, and/or the like) may transmit scheduling information for a transmission of the preempted PDU, as described above.

Process 900 may include additional aspects, such as any single aspect or any combination of aspects described below and/or in connection with one or more other processes described elsewhere herein.

In a first aspect, the indication comprises a MAC CE.

In a second aspect, alone or in combination with the first aspect, the indication is received in a PDU that is transmitted after the preempted PDU.

In a third aspect, alone or in combination with one or more of the first and second aspects, the indication is received in a PDU that preempts the preempted PDU.

In a fourth aspect, alone or in combination with one or more of the first through third aspects, the indication is received in connection with information that indicates that the preempted PDU is preempted in a physical layer of the UE.

In a fifth aspect, alone or in combination with one or more of the first through fourth aspects, the indication includes a HARQ process identifier associated with the preempted PDU or a buffer report MAC CE that identifies a logical channel group identifier associated with the preempted PDU.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining that handling of a protocol data unit (PDU) by the UE is preempted, wherein the PDU is a preempted PDU;
    transmitting an indication, generated by a medium access control (MAC) layer of the UE, that the preempted PDU is preempted, wherein the indication is transmitted in a PDU that is transmitted after the preempted PDU, and wherein the PDU that is transmitted after the preempted PDU is different from a PDU that preempts the preempted PDU; and
    receiving scheduling information for a transmission of the preempted PDU.

2. The method of claim 1, wherein the indication comprises a MAC control element (CE).

3. The method of claim 1, wherein the indication is transmitted in connection with information received by the MAC layer from a physical layer of the UE that indicates that the preempted PDU is preempted in the physical layer of the UE.

4. The method of claim 1, wherein the indication includes a hybrid automatic repeat request (HARQ) process identifier associated with the preempted PDU.

5. The method of claim 1, wherein the indication includes a buffer report MAC control element (CE) that identifies a logical channel group identifier associated with the preempted PDU.

6. The method of claim 5, wherein the buffer report MAC CE is a short buffer MAC CE with a zero buffer size.

7. The method of claim 5, wherein the buffer report MAC CE is a long buffer report MAC CE with a non-zero buffer size.

8. The method of claim 5, wherein a buffer size of the buffer report MAC CE indicates a size of the preempted PDU.

9. The method of claim 5, wherein a buffer size of the buffer report MAC CE indicates a sum of a size of the preempted PDU and data available for a logical channel group associated with the preempted PDU.

10. The method of claim 1, wherein the preempted PDU is one of a plurality of preempted PDUs, and wherein the indication identifies the plurality of preempted PDUs.

11. The method of claim 1, wherein the preempted PDU is one of a plurality of preempted PDUs, and wherein transmitting the indication further comprises transmitting a plurality of indications corresponding to the plurality of preempted PDUs.

12. A method of wireless communication performed by a network entity, comprising:
    receiving an indication, generated by a medium access control (MAC) layer of a user equipment (UE), that handling of a protocol data unit (PDU) by the UE is preempted, wherein the PDU is a preempted PDU, wherein the indication is received in a PDU that is transmitted after the preempted PDU, and wherein the PDU that is transmitted after the preempted PDU is different from a PDU that preempts the preempted PDU; and
    transmitting scheduling information for a transmission of the preempted PDU.

13. The method of claim 12, wherein the indication comprises a MAC control element (CE).

14. The method of claim 12, wherein the indication is received in connection with information that indicates that the preempted PDU is preempted in a physical layer of the UE.

15. The method of claim 12, wherein the indication includes a hybrid automatic repeat request (HARQ) process identifier associated with the preempted PDU.

16. The method of claim 12, wherein the indication includes a buffer report MAC control element (CE) that identifies a logical channel group identifier associated with the preempted PDU.

17. The method of claim 16, wherein a buffer size of the buffer report MAC CE indicates a size of the preempted PDU.

18. A user equipment (UE) for wireless communication, comprising:
    a memory; and
    one or more processors, coupled to the memory, configured to:

determine that handling of a protocol data unit (PDU) by the UE is preempted, wherein the PDU is a preempted PDU;

transmit an indication, generated by a medium access control (MAC) layer of the UE, that the preempted PDU is preempted, wherein the indication is transmitted in a PDU that is transmitted after the preempted PDU, and wherein the PDU that is transmitted after the preempted PDU is different from a PDU that preempts the preempted PDU; and receive scheduling information for a transmission of the preempted PDU.

19. The UE of claim 18, wherein the indication comprises a MAC control element (CE).

20. The UE of claim 18, wherein the indication is transmitted in connection with information received by the MAC layer from a physical layer of the UE that indicates that the preempted PDU is preempted in the physical layer of the UE.

21. The UE of claim 18, wherein the indication includes a hybrid automatic repeat request (HARQ) process identifier associated with the preempted PDU.

22. The UE of claim 18, wherein the indication includes a buffer report MAC control element (CE) that identifies a logical channel group identifier associated with the preempted PDU.

23. The UE of claim 22, wherein the buffer report MAC CE is a short buffer MAC CE with a zero buffer size.

24. The UE of claim 22, wherein the buffer report MAC CE is a long buffer report MAC CE with a non-zero buffer size.

25. The UE of claim 22, wherein a buffer size of the buffer report MAC CE indicates a size of the preempted PDU.

26. The UE of claim 22, wherein a buffer size of the buffer report MAC CE indicates a sum of a size of the preempted PDU and data available for a logical channel group associated with the preempted PDU.

27. The UE of claim 18, wherein the preempted PDU is one of a plurality of preempted PDUs, and wherein the indication identifies the plurality of preempted PDUs.

28. The UE of claim 18, wherein the preempted PDU is one of a plurality of preempted PDUs, and wherein transmitting the indication further comprises transmitting a plurality of indications corresponding to the plurality of preempted PDUs.

29. A network entity for wireless communication, comprising:

a memory; and one or more processors, coupled to the memory, configured to:

receive an indication, generated by a medium access control (MAC) layer of a user equipment (UE), that handling of a protocol data unit (PDU) by the UE is preempted, wherein the PDU is a preempted PDU, wherein the indication is received in a PDU that is transmitted after the preempted PDU, and wherein the PDU that is transmitted after the preempted PDU is different from a PDU that preempts the preempted PDU; and transmit scheduling information for a transmission of the preempted PDU.

30. The network entity of claim 29, wherein the indication comprises a MAC control element (CE).

31. The network entity of claim 29, wherein the indication is received in connection with information that indicates that the preempted PDU is preempted in a physical layer of the UE.

* * * * *